United States Patent
Castan et al.

(10) Patent No.: US 9,140,185 B2
(45) Date of Patent: Sep. 22, 2015

(54) LOCATING MECHANISM FOR TURBOCHARGER BEARING

(75) Inventors: Joel Castan, Chantraine (FR); Jose Alves, Frizon (FR); Gerard Dieudonne, Les Forges (FR); Dominique Armand, Vosges (FR); Didier Horlaville, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 1615 days.

(21) Appl. No.: 12/625,493

(22) Filed: Nov. 24, 2009

(65) Prior Publication Data

US 2011/0120125 A1 May 26, 2011

(51) Int. Cl.
| | |
|---|---|
| F02C 6/12 | (2006.01) |
| F02C 7/06 | (2006.01) |
| F16C 17/10 | (2006.01) |
| F16C 35/02 | (2006.01) |
| F16C 27/02 | (2006.01) |
| F16C 33/08 | (2006.01) |
| F16C 33/10 | (2006.01) |
| F16C 17/18 | (2006.01) |

(52) U.S. Cl.
CPC . *F02C 6/12* (2013.01); *F16C 17/10* (2013.01); *F16C 27/02* (2013.01); *F16C 33/08* (2013.01); *F16C 33/1065* (2013.01); *F16C 35/02* (2013.01); *F05D 2220/40* (2013.01); *F05D 2230/64* (2013.01); *F05D 2240/53* (2013.01); *F16C 17/18* (2013.01); *F16C 2360/24* (2013.01)

(58) Field of Classification Search
CPC ... F02C 6/12; F05D 2220/40; F05D 2230/64; F05D 2240/53; F16C 17/10; F16C 17/18; F16C 2360/24; F16C 27/02; F16C 33/08; F16C 33/1065; F16C 35/02

USPC .................. 417/405–409; 384/906
See application file for complete search history.

(56) References Cited

U.S. PATENT DOCUMENTS

| | | | | |
|---|---|---|---|---|
| 4,240,678 A | * | 12/1980 | Sarle et al. | 384/369 |
| 4,818,830 A | * | 4/1989 | Bron | 200/341 |
| 4,852,865 A | * | 8/1989 | Edrich et al. | 269/48 |

(Continued)

FOREIGN PATENT DOCUMENTS

| | | |
|---|---|---|
| EP | 2069747 A2 | 5/2009 |
| JP | 2005048860 A | 2/2005 |
| JP | 20050488560 A | 2/2005 |

OTHER PUBLICATIONS

EPO Application No. 10 189 530.8, Search Report of EPO of Feb. 17, 2015 (6 pages).

*Primary Examiner* — Peter J Bertheaud
*Assistant Examiner* — Dominick L Plakkoottam
(74) *Attorney, Agent, or Firm* — Brian J. Pangrle

(57) ABSTRACT

An exemplary semi-floating bearing for a turbocharger has a central axis defining a cylindrical coordinate system with an axial direction, a radial direction and an angular direction; a turbine end; a compressor end; journal surfaces between the turbine end and the compressor end, the surfaces configured to support a turbocharger shaft; and an opening disposed between the turbine end and the compressor end, the opening having a radial dimension that exceeds an axial dimension to, upon receipt of a locating pin, provide for movement of the bearing in the angular direction about its central axis and to provide for lesser movement of the bearing in the axial direction. Other exemplary bearings, arrangements and methods are also disclosed.

9 Claims, 4 Drawing Sheets

(56) References Cited

U.S. PATENT DOCUMENTS

| | | | |
|---|---|---|---|
| 6,017,184 A * | 1/2000 | Aguilar et al. | 415/112 |
| 7,753,591 B2 * | 7/2010 | Petitjean et al. | 384/397 |
| 2007/0110351 A1 * | 5/2007 | Larue | 384/535 |
| 2007/0147721 A1 * | 6/2007 | Mavrosakis | 384/512 |
| 2009/0293257 A1 * | 12/2009 | Castan et al. | 29/464 |

* cited by examiner

LOCATING MECHANISM FOR TURBOCHARGER BEARING

TECHNICAL FIELD

Subject matter disclosed herein generally relates to turbochargers and particularly mechanisms to locate a turbocharger bearing that can reduce noise.

BACKGROUND

Various mechanisms exist to control or limit turbocharger noise. For example, a turbocharger may be fitted with an acoustic damping mechanism (e.g., a noise shield, a muffler, etc.) that aims to damp noise. Other types of mechanisms aim to control or limit a source or sources of noise generation, which may also improve turbocharger performance. For example, where noise arises due to instability of a rotor-bearing system (RBS), a mechanism that enhances stability of the RBS may also reduce noise generated by the RBS. As described herein, the term "instability" is associated with rotordynamics (e.g., fluid dynamic pressure around a circumference of a rotor component) while unbalance is associated with components and assembled components (e.g., an unbalanced compressor wheel, shaft or turbine wheel).

Some types of turbocharger noise are associated with synchronous vibration (SV) while other types are associated with non-synchronous vibration (NSV), which includes sub-synchronous vibration and supersynchronous vibration. Synchronous refers to synchrony with a component such as a rotating shaft. For example, vibration that increases in frequency directly with shaft rotational frequency is considered synchronous (e.g., due to assembly unbalance). In contrast, vibration associated with a lubricant film is typically non-synchronous, i.e., while related to turbocharger operation, the relationship between shaft rotational frequency and vibration are not direct. For example, NSV may arise from an unstable RBS mode characterized by clearances, lubricant properties and particular operational conditions that occur from time to time. Such modes are often bound and may reach a limit cycle that limits amplitude. In other instances, NSV may be unbound and increase in amplitude, which can result in excessive vibration, noise and even destruction of components. When a turbocharger is coupled to an internal combustion engine, engine vibrations can also add to NSV, for example, engines are known to introduce significant and complex, low frequency subsynchronous whirl in turbochargers, which may be multiples of engine speed.

NSV can be the result of many design parameters. Control of these parameters is not always easy and, for some turbochargers, NSV may be unavoidable due to basic design requirements. Some mechanisms that aim to control NSV rely on specialized, modified or optimized rotor supports, which can have drawbacks such as increased cost, complexity or reduced component tolerance. To date, the associated drawbacks of such mechanisms seldom outweigh marginal reductions in NSV.

Of course, proper balancing of turbocharger components, individually and in various stages of assembly, can reduce noise generation. However, as noted, various non-synchronous vibrations are indirectly related to shaft rotational speed and therefore not addressed by balancing. For example, non-synchronous whirl may be caused by lubricant film dynamics, considered "self-excited", that become sustaining at a certain shaft speed (e.g., "oil whip"). When components are assembled, so-called "stackup" imbalance may occur. For smaller turbochargers, assembly balancing can significantly reduce stackup unbalance, which is known to generate screaming or whining noise.

Balancing may be performed at "low" speed or "high" speed. Various commercially available balancing machines (e.g., "vibration sort rig" (VSR) machines) are configured for high speed balancing of turbocharger cores (e.g., cartridges, RBSs or center housing rotating assemblies (CHRAs)). A typical VSR machine-based balancing process supplies lubricant and drives a rotor using compressed air. Such balancing requires various manual steps, including noting heavy point(s) and manual cutting. Depending on the amount of unbalance, a person may need to repeat such steps, which adds cost. Various low speed balancing machines allow for two-plane balancing and can achieve acceptable results; noting that many high speed balancing machines only allow for single plane balancing. In either instance, i.e., low or high speed, balancing is a necessary cost for proper operation, noise reduction and longevity of turbochargers.

As described herein, a need exists for cost-effective mechanisms that can reduce turbocharger noise. Such mechanisms should not introduce complicated manufacture specifications or introduce additional component and assembly unbalance issues.

DESCRIPTION OF DRAWINGS

Non-limiting and non-exhaustive examples are described with reference to the following figures.

DETAILED DESCRIPTION

Figure 1:
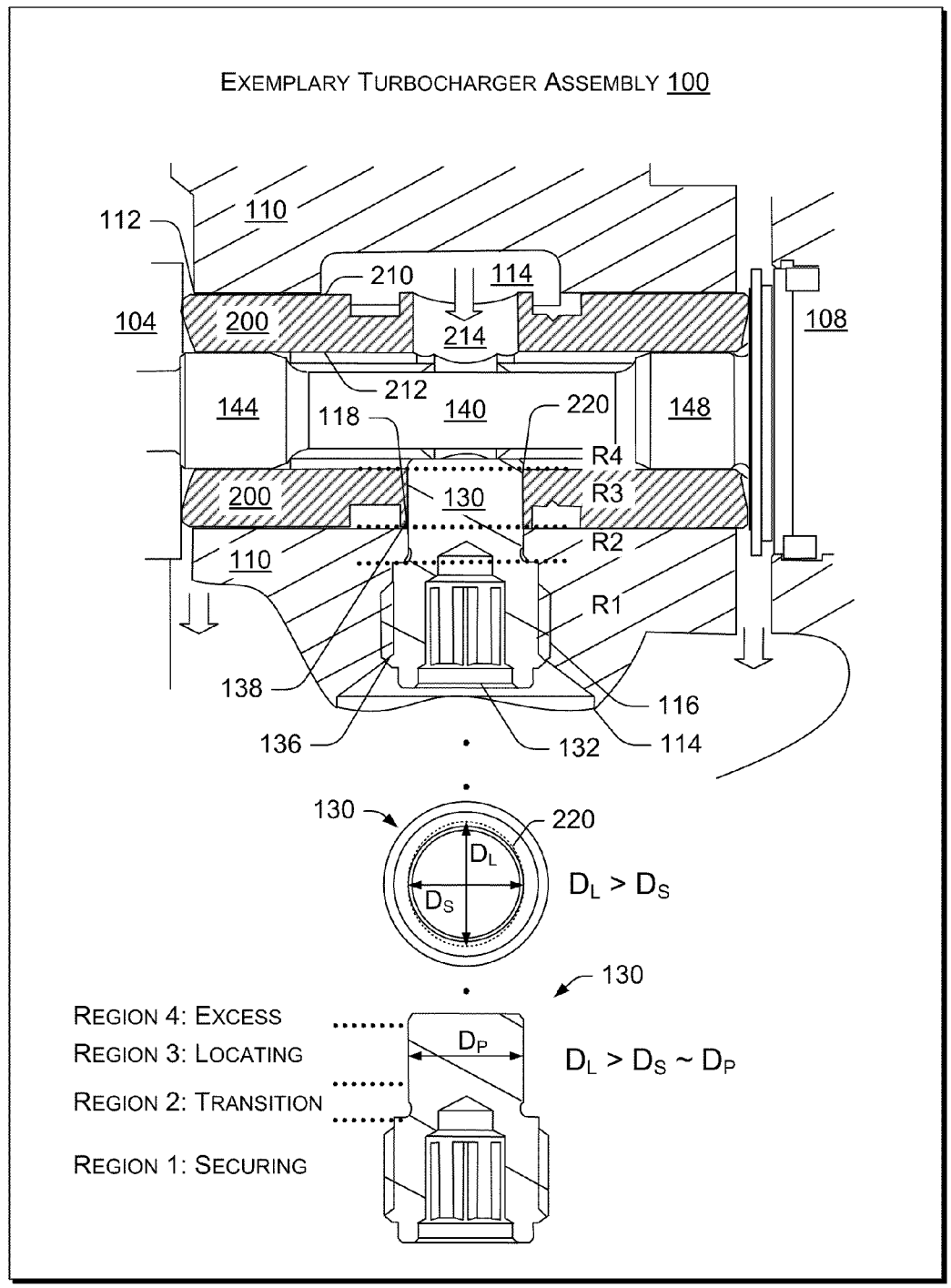
FIG. 1 is a diagram of a turbocharger assembly with an exemplary bearing that includes an oblong receptacle configured to receive a locating pin.

Some turbocharger assemblies include a one-piece bearing that provides both journal and thrust support for a turbocharger shaft. Such a bearing is typically located in a center housing of a turbocharger assembly by a unitary locating pin. During operation of a turbocharger, various forces can act on the bearing. To prevent unacceptable movement of the bearing, the locating pin must be sufficiently durable. Further, clearances associated with the locating pin should be chosen to prevent movements that could cause excessive wear over numerous operational cycles. Yet further, the material of construction of the locating pin must be chosen to handle the forces over a lifetime of the turbocharger assembly.

As described herein, an exemplary receptacle for a locating pin can enhance bearing performance. In various examples, a locating pin receptacle has a dimension in an angular direction (e.g., azimuthal direction) that exceeds a dimension in an axial direction. For example, a receptacle may have an oblong shape with a diameter in the angular direction that exceeds a diameter in the axial direction. Such a shape allows for angular movement while axially locating a bearing. In turbocharger operation, various vibration modes are associated with one or more lubricant films bordering a bearing. As described herein, increased angular movement provided by an oblong locating pin receptacle reduces noise associated with at least some of these modes. When compared to conventional locating pins and receptacles with circular cross-sections and small clearances in both angular and axial dimensions, an exemplary receptacle and pin arrangement has more degrees of freedom, which, in turn, can benefit performance.

Trial data show that various exemplary arrangements can reduce noise and improve VSR balancing and rolled through-put yield (RTY). For example, various bearings (model GT12/15 Z) that were rejected as being out of specification on VSR balancing were refashioned by replacing the cylindrical hole in the bearing (i.e., a constant diameter opening with equal radial and axial dimensions) by an oblong hole where the oblong hole had an increased radial dimension of about 60 μm along the radial direction (e.g., approximately a 1% increase in radial dimension; see, e.g., dimensions Δ and $D_L$ of the example shown in FIG. 3). No changes were made to the associated locating pin, configured for receipt by the hole. Trials indicated that the increased diameter in the radial direction allowed for increased angular movement of the bearing with respect to the locating pin. Trials on the assemblies with the refashioned bearing receptacles were 100% within specification on VSR balancing, which, as a result, increased RTY.

Various exemplary arrangements can provide for particular bearing motion while keeping bearing location under control for compressor/turbine wheel to housing clearances. While various examples are described with respect to unitary bearings with journal and thrust support, an exemplary receptacle may be applied to other types of bearings, for examples, such as those that rely on one or more locating pins (e.g., a bearing cartridge).

FIG. 1 shows an exemplary assembly 100 for a turbocharger (e.g., a turbocharger assembly). The assembly 100 has a compressor side 104 and a turbine side 108 with a center housing 110 disposed between these two sides. The housing 110 includes a substantially cylindrical surface 112 that defines a bore. The surface 112 is typically disposed at a substantially constant radius about a central axis (e.g., which coincides with a rotational axis of the turbocharger). The bore defining surface 112 meets another surface 114 that extends less than 360° around the central axis and includes a radius that exceeds the bore radius so as to define a lubricant well for the bore.

As shown in FIG. 1, an exemplary bearing 200 is seated in the bore. The bearing 200 has a substantially cylindrical wall defined largely by an outer surface 210 and an inner surface 212. The outer surface 210 is disposed at an outer radius about a central axis of the bearing 200 and the inner surface 212 is disposed at an inner radius about the central axis. The radius of the outer surface 210 is less than the radius of the bore surface 112 and greater than the radius of the inner surface 212.

The difference in the radii of the bore surface 112 and the outer surface 210 of the bearing define a lubricant film thickness that can help damp movement of the bearing 200 in the housing 110. An opening 214 in the wall of the bearing 200 allows lubricant to flow from the lubricant well defined by surface 114 to the inner surface 212 and correspondingly to a shaft bore defined by the inner surface 212.

In FIG. 1, a shaft 140 is shown positioned in the shaft bore of the bearing 200. The shaft 140 has a compressor side journal surface 144 and a turbine side journal surface 148. The surfaces 144 and 148 are typically disposed at a common radius about a rotational axis of the shaft 140. The common radius of the journal surfaces 144 and 148 is less than the inner radius of 212 of the bearing 200. The difference in radii define a lubricant film thickness to lubricate the journal surfaces 144 and 148 as the shaft 140 rotates in the bearing 200.

In the assembly 100 of FIG. 1, axial movement (e.g., translational movement) and rotational movement (or angular movement) of the bearing 200 are limited by varying degrees by an exemplary locating pin mechanism. The locating pin mechanism relies on features of the housing 110, features of the bearing 200 and a locating pin 130. The housing 110 includes an opening 114 and threads 116 and a pilot surface 118. The bearing 200 includes an opening 220. The locating pin 130 includes a tool receptacle 132, threads 136 and a locating surface 138. These features of the housing 110, the bearing 200 and the pin 130 may be further defined by four regions R1, R2, R3 and R4 where R1 is referred to as a securing region, R2 is referred to as a transition region, R3 is referred to as a locating region and R4 is referred to as an excess region, which may or may not exist depending on dimensions of the various features. The housing 110 and the pin 130 include the securing region R1 and the transition region R2 while the bearing 120 and the pin 130 include the locating region R3.

Upon insertion of the pin 130 into the opening 114 of the housing 110, the locating surface 138 of the pin 130 is preferably aligned with the opening 220 of the bearing 200 to axially locate the bearing 200 in the bore of the housing 110 and to allow some rotation of the bearing 200 about its axis. A tool may be positioned in the tool receptacle 132 of the pin 130 to rotate the pin 130 about a rotational axis. Accordingly, in the securing region R1, the threads 116 of the housing cooperate with the threads 136 of the locating pin 130 to secure the pin 130 in the housing 110.

As the turbocharger shaft 140 may rotate at speeds in excess of 100,000 RPM, features of the housing 110, the bearing 200, the pin 130 and the shaft 140 must be accurately dimensioned. In the assembly 100, the pin 130 plays an important role in locating the bearing 200 in the housing 110. In the example of FIG. 1, the opening 220 includes a long dimension or diameter $D_L$ and a short dimension or diameter $D_S$ (i.e., where $D_L > D_S$). A top view of the opening 220 and pin 130 shows an upper gap and a lower gap between the pin 130 and the opening 220 that allow the bearing 220 to rotate about its axis. However, clearance between the pin 130 and the opening 220 along an axial dimension of the bearing 200 is less to thereby axially locate the bearing 200 in the housing 110. As indicated, the dimension $D_S$ may be approximately the same as the dimension or diameter $D_P$ of the locating region (R3) of the pin 130.

Figure 2:
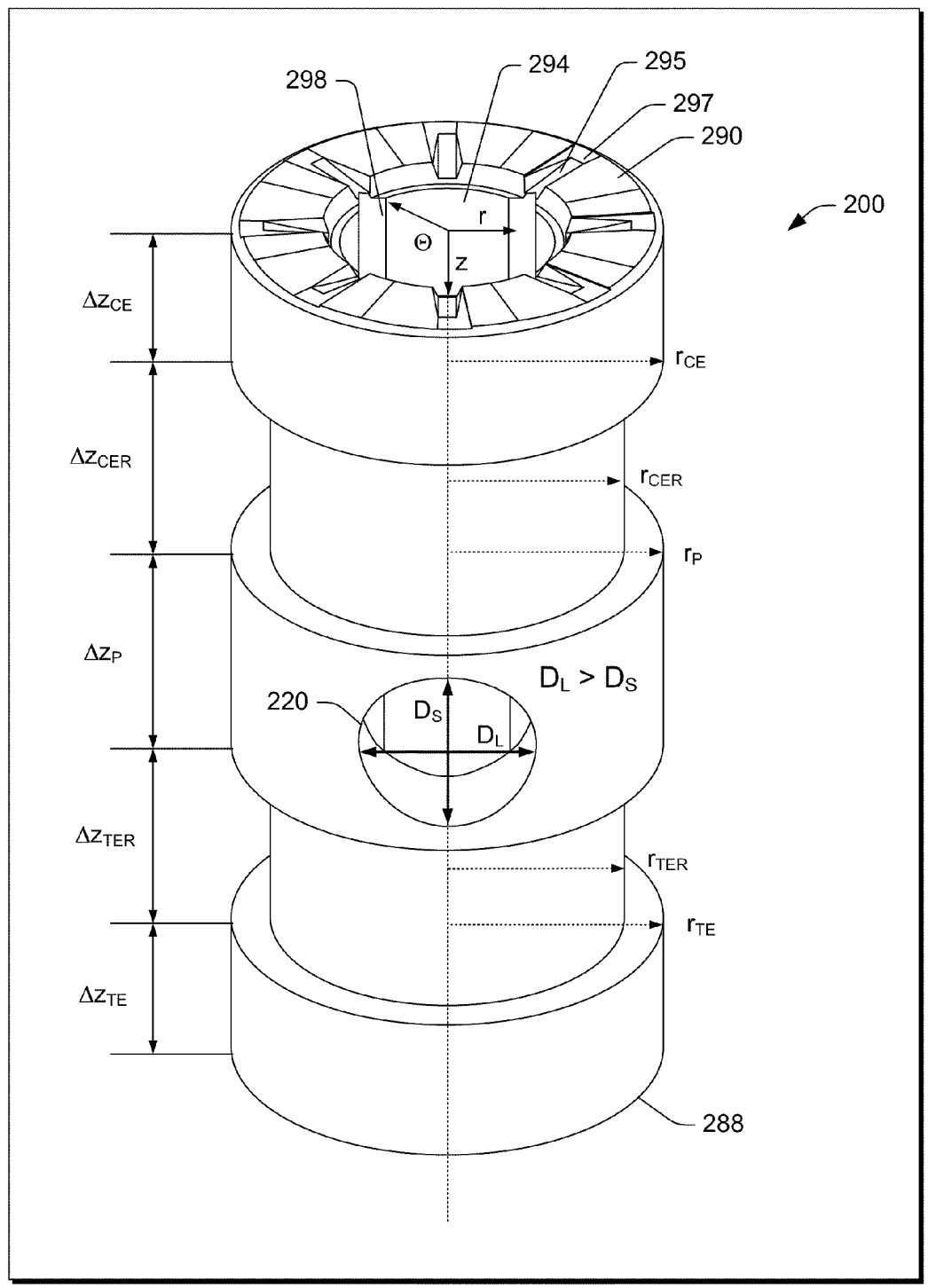
FIG. 2 is a perspective of the bearing of FIG. 1.

FIG. 2 shows a perspective view of the exemplary bearing 200 of FIG. 1. A cylindrical coordinate system (r, Θ, z) is shown where the (r, z) origin is along the central axis of the bearing 200. Thrust surfaces 288 and 290 are located at opposite ends of the bearing. While this example includes thrust surfaces 288 at the turbine end and thrust surfaces 290 at the compressor end, a bearing may include thrust surfaces at a turbine end only or at a compressor end only. When configured as a unitary bearing structure, the bearing 200 provides the minimum parts count and forces maximum parallelism of the thrust surfaces during wobbling action of the bearing. An exemplary bearing may be configured as a multi-component bearing. The location of opening or receptacle 220, which can receive a locating pin, to axially locate the bearing 200 and to allow some rotational movement of the bearing 200 when positioned in a bore of a center housing. In the example of FIG. 2, the opening 220 is located centrally, however, in other examples, such an opening may be closer to the turbine end or closer to the compressor end. In yet other examples, an exemplary bearing may include multiple openings.

The bore 294 of the bearing 200 extends between the thrust surfaces 288, 290 and incorporates end portions which are characterized by an enhanced surface finish for bearing support of the unrelieved portions of the shaft. Axial grooves 298 extend longitudinally along the bore surface for lubricant flow. The axial grooves additionally provide an enhancement in rotordynamics by improving resistance to subsynchronous shaft motion through reduction of oil whirl encountered in lightly loaded bearing conditions. The axial grooves may vary in dimension, location and number.

The thrust surfaces 288, 290 incorporate of plurality of radial grooves 295 which provide improved thrust capacity while enhancing contamination control. In the example of FIG. 2, the bearing 200 includes eight radial grooves at each end (about 45° spacing between adjacent radial grooves) and four of the grooves align with the axial grooves 298 in the bearing bore. In the example of FIG. 2, each of the axial grooves 298 has a V-shape while each of the radial grooves 295 has a somewhat U-shape. Groove depth may be of the order of about 0.15 mm to about 0.25 mm and a radius at the vertex of a V-shaped groove may be provided. A relief 297 on the inner periphery of each thrust surface can further enhance lubricant delivery and distribution.

FIG. 2 shows various dimensions for the bearing 200. The upper perspective view shows dimensions $\Delta z_{CE}$ as an axial distance for a compressor end thrust section, $\Delta z_{CER}$ as an axial distance for a compressor end recessed section, $\Delta z_P$ as an axial distance for a pin receiving section, $\Delta z_{TER}$ as an axial distance for a turbine end recessed section, and $\Delta z_{TE}$ as an axial distance for a turbine end thrust section. The lower perspective view shows dimensions $r_{CE}$ as a radial distance for an outer surface for a compressor end thrust section, $r_{CER}$ as a radial distance for an outer surface for a compressor end recessed section, $r_P$ as a radial distance for an outer surface for a pin receiving section, $r_{TER}$ as a radial distance for an outer surface for a turbine end recessed section, and $r_{TE}$ as a radial distance for an outer surface for a turbine end thrust section. While transitions from section to section appear as approximately 90° shoulders, other types of transitions may be used.

The opening 220 includes a long dimension $D_L$ and a short dimension $D_S$. The dimension $D_L$ is in a radial direction while the dimension $D_S$ is in an axial direction. In the example of FIG. 2, the opening 220 is oblong to allow for some angular movement of the bearing 200 about its axis when positioned in a bore of a center housing and located axially by a locating pin received at least partially by the opening 220.

Figure 3:
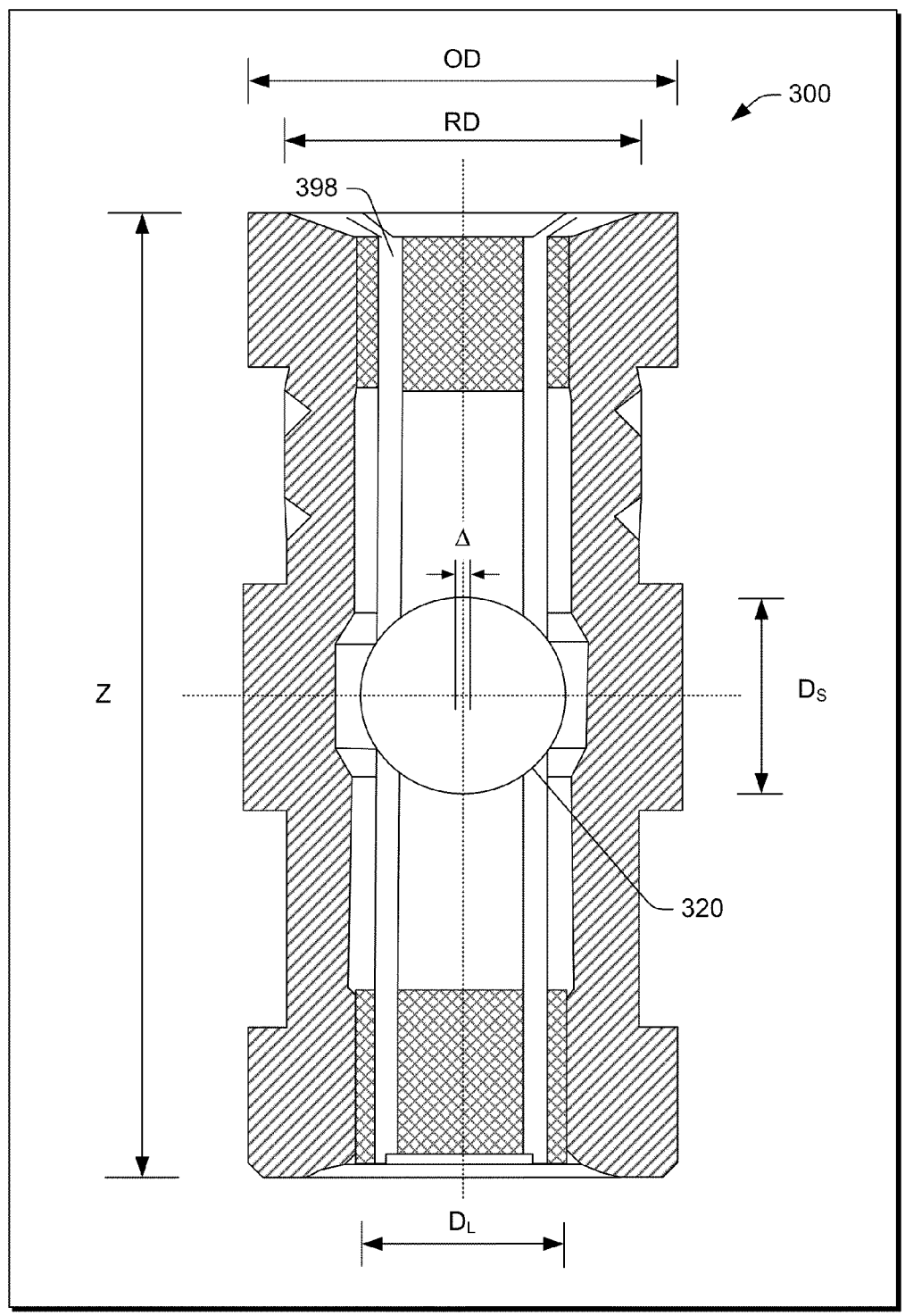
FIG. 3 is a cross-sectional view of an exemplary bearing.

FIG. 3 shows a particular example of an exemplary bearing 300. The bearing 300 includes an opening 320 with a radial dimension ($D_L$) and an axial dimension ($D_S$). In the example of FIG. 3, $D_L$ is approximately 1% greater than $D_S$ (e.g., $\Delta$ is approximately 1% of $D_S$) and the bearing 300 has a length dimension (Z) and an outer diameter (OD) where the dimension Z is about 2.25 times the dimension OD. As shown in FIG. 3, the bearing 300 includes a recess diameter (RD) that is about 70% of the OD. These dimensions correspond to exemplary bearings referred to in the trials where the dimension $D_L$ is about 46% of the OD. Exemplary bearings may have other shapes, number of components, dimensions, etc.

Figure 4:
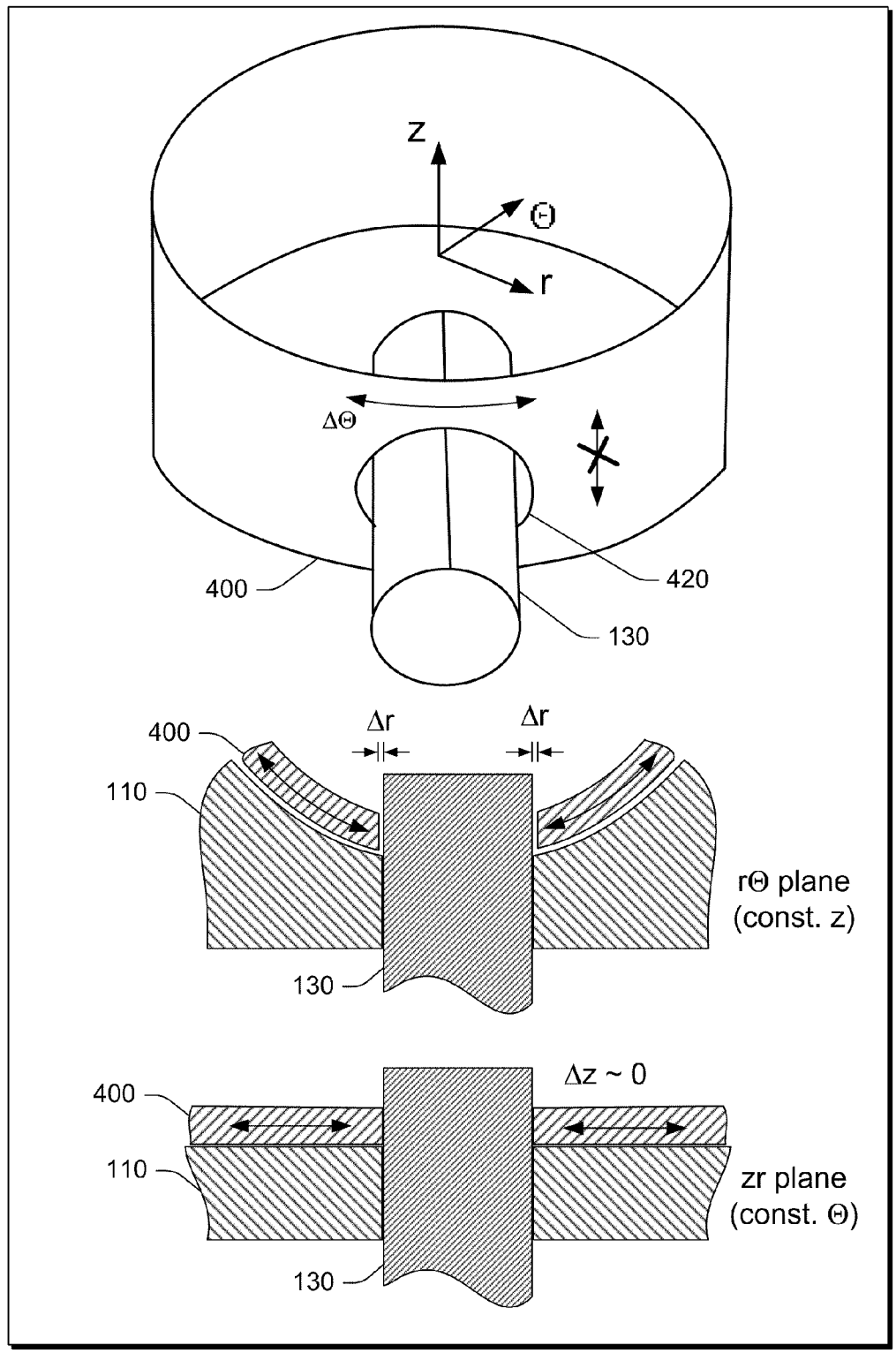
FIG. 4 is a diagram of an exemplary bearing and pin arrangement with cross-sectional views in two planes.

FIG. 4 shows a diagram of a partial perspective view of an exemplary bearing 400 along with cross-sectional views in two different planes (rΘ plane and zr plane) that show a portion of a housing 110. The bearing 400 is shown as including an opening 420 with a pin 130 disposed therein. In the rΘ plane gaps exist between the pin 130 and the bearing 400 as defined by the opening 420 and the pin 130. These gaps are shown as having dimension Δr. Rotation of the bearing 400 may occur about its z-axis as defined by angular movement ΔΘ (e.g., +/−ΔΘ) that is limited by the clearance between the pin 130 and the bearing 400 as defined by the opening 420. An exemplary bearing may include a dimension Δr_1 on one side that is larger than such a dimension Δr_2 on the other side. For example, the center point of the long dimension may be offset from the center point of the short dimension. In the zr plane, a tight fit (e.g., press fit) is shown between the pin 130 and the bearing 400 at the opening 420 to axially locate the bearing 400 in a housing 110.

As described herein, an exemplary semi-floating bearing for a turbocharger includes a central axis defining a cylindrical coordinate system with an axial direction, a radial direction and an angular direction; a turbine end; a compressor end; journal surfaces between the turbine end and the compressor end, the surfaces configured to support a turbocharger shaft; and an opening disposed between the turbine end and the compressor end, the opening having a radial dimension that exceeds an axial dimension to, upon receipt of a locating pin, provide for movement of the bearing in the angular direction about its central axis and to provide for lesser movement of the bearing in the axial direction. In such an example, the opening may be an oblong opening.

As described herein, an exemplary assembly includes a center housing that has a through bore extending from a turbine end to a compressor end; a locating pin; and a bearing that includes an oblong opening disposed between a turbine end and a compressor end configured for receipt of the locating pin to define a radial clearance and an axial clearance where the radial clearance exceeds the axial clearance. In such an example, the radial clearance can provide for angular movement of the bearing about its central axis. As described herein, an axial clearance axially locates a bearing in a through bore, optionally to allow for some thermal expansion but, in general, minimal axial movement. While various examples mention a unitary bearing with journal and thrust support, other types of bearing or bearing cartridges may include an exemplary opening for receipt of a locating pin.

As described herein, an exemplary method includes providing a semi-floating bearing located in a bore of a center housing with a locating pin; rotating a turbocharger shaft supported by the semi-floating bearing; and, without axially translating the semi-floating bearing in the bore of the center housing, rotating the semi-floating bearing in the bore of the center housing. In such a method, a radial clearance between the locating pin and an oblong opening of the semi-floating bearing allow for rotating the semi-floating bearing in the bore of the center housing. In such a method, dimensions of the locating pin and an oblong opening of the semi-floating bearing restrict axial translation of the semi-floating bearing in the bore of the center housing (e.g., matching a short dimension of the opening to a diameter of the pin). Various techniques described herein can reduce noise generation. For example, a method may include rotating the aforementioned semi-floating bearing to reduce noise generation. Noise reduction may be associated increased freedom of the bearing with respect to a lubricant film between the semi-floating bearing and the center housing. For example, rotation of the bearing may help to stabilize the lubricant film.

An exemplary method may include balancing a turbocharger shaft, a compressor wheel and a turbine wheel supported by a semi-floating bearing disposed in the bore of the center housing where the bearing has an oblong opening that receives a locating pin in a manner that allows for some angular movement of the bearing about its central axis.

Although some exemplary methods, devices, systems, arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. A turbocharger comprising a semi-floating bearing, the bearing comprising:
   a central axis defining a cylindrical coordinate system with an axial direction, a radial direction and an angular direction;
   a turbine end;
   a compressor end;
   journal surfaces between the turbine end and the compressor end, the journal surfaces configured to support a turbocharger shaft; and
   an opening disposed between the turbine end and the compressor end, the opening having a radial dimension that exceeds an axial dimension to, upon receipt of a locating pin, provide for movement of the bearing in the angular direction about its central axis and to provide for lesser movement of the bearing in the axial direction.

2. The turbocharger of claim 1 further comprising a locating pin.

3. The turbocharger of claim 2 wherein the locating pin comprises a locating region with a diameter approximately equal to the axial dimension of the opening.

4. An assembly comprising:
   a center housing that comprises a through bore extending from a turbine end to a compressor end;
   a locating pin; and
   a semi-floating bearing disposed in the bore, wherein the semi-floating bearing comprises
      a central axis defining a cylindrical coordinate system with an axial direction, a radial direction and an angular direction,
      journal surfaces between a turbine end and a compressor end of the semi-floating bearing, the journal surfaces configured to support a turbocharger shaft, and
      an opening disposed between the turbine end and the compressor end of the semi-floating bearing, the opening having a radial dimension that exceeds an axial dimension to, upon receipt of the locating pin, provide for movement of the semi-floating bearing in the angular direction about its central axis and to provide for lesser movement of the semi-floating bearing in the axial direction.

5. A method comprising:
   providing a semi-floating bearing located in a bore of a center housing with a locating pin wherein the semi-floating bearing comprises
      a central axis defining a cylindrical coordinate system with an axial direction, a radial direction and an angular direction,
      journal surfaces between a turbine end and a compressor end of the semi-floating bearing, the journal surfaces configured to support a turbocharger shaft, and
      an opening disposed between the turbine end and the compressor end of the semi-floating bearing, the opening having a radial dimension that exceeds an axial dimension;
   rotating the turbocharger shaft supported by the semi-floating bearing; and
   without axially translating the semi-floating bearing in the bore of the center housing, rotating the semi-floating bearing in the bore of the center housing.

6. The method of claim 5 wherein rotating the semi-floating bearing reduces noise generation.

7. The method of claim 5 further comprising providing a lubricant film between the semi-floating bearing and the center housing.

8. The method of claim 7 wherein rotating the semi-floating bearing stabilizes the lubricant film.

9. The method of claim 5 further comprising balancing the turbocharger shaft, a compressor wheel and a turbine wheel supported by the semi-floating bearing disposed in the bore of the center housing.

* * * * *